United States Patent [19]
McLean et al.

[11] 3,785,216
[45] Jan. 15, 1974

[54] CONTROL SYSTEMS FOR HYDROKINETIC DEVICES

[75] Inventors: Norman McLean; Donald Bernard Lewis; Robert John Lawson McLaren, all of Worcester, England

[73] Assignee: Redman Heenan Froude Limited, Worcester, England

[22] Filed: Nov. 15, 1971

[21] Appl. No.: 198,564

[30] Foreign Application Priority Data
Nov. 27, 1970  Great Britain .................... 56410/70

[52] U.S. Cl. .............................................. 73/134
[51] Int. Cl. .............................................. G01l 3/20
[58] Field of Search ........................... 73/134, 136 D

[56] References Cited
UNITED STATES PATENTS
3,364,736  1/1968  Bathurst et al. ...................... 73/134

3,050,993  8/1962  Draughton et al. .................... 73/134

FOREIGN PATENTS OR APPLICATIONS
552,586  4/1943  Great Britain ........................ 73/134

*Primary Examiner*—James J. Gill
*Attorney*—Joseph F. Brisebois et al.

[57] ABSTRACT

A control system for a hydrokinetic device such as a dynamometer in which an electrical signal dependent upon the difference between a desired and the measured value of an operating parameter of the device is applied to a control unit. The latter is adapted to control the position of a fluid regulating valve associated with the inlet or outlet of the device, the valve being specially characterised so that displacement thereof is directly proportional to the torque developed by the device.

5 Claims, 6 Drawing Figures

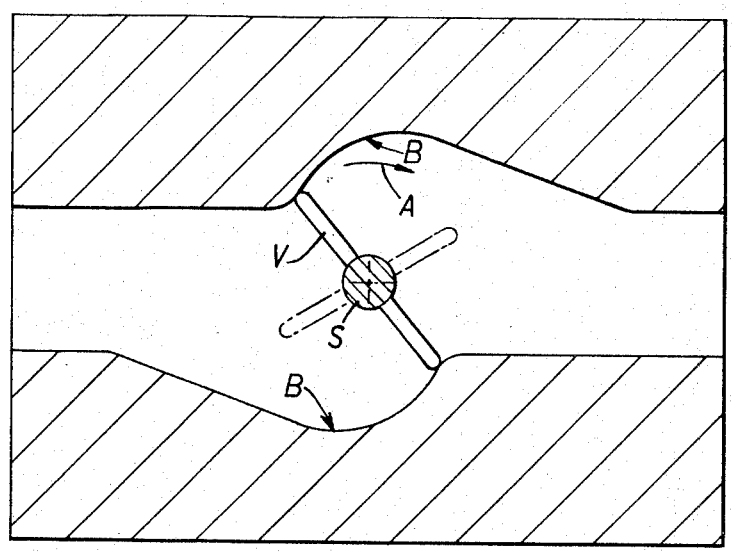
FIG. IA
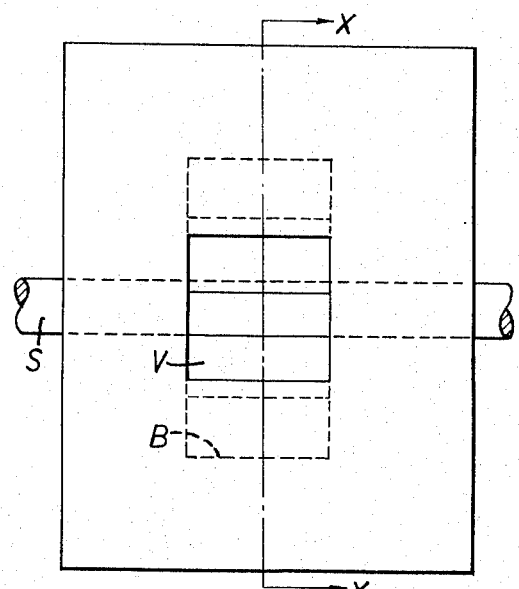
FIG. I.

CONTROL SYSTEMS FOR HYDROKINETIC DEVICES

This invention relates to control systems for hydrokinetic devices such as dynamometers, brakes or torque converters, hereinafter generally referred to as dynamometers.

When a dynamometer is used to test an engine or any prime mover, desirably there should be available a system whereby the dynamometer can be accurately controlled in a desired manner so as satisfactorily to subject the engine to the necessary operating conditions. Thus, the testing equipment for an engine must include an accurate and consistent way of reproducing the conditions to which the engine is subjected in service. A hydrokinetic dynamometer, such as the Froude, provides a relatively cheap machine for this purpose and also has the advantage of low inertia moving parts; this renders them most suitable for the testing of engines provided they are fitted with a rapid response control system.

According to the present invention, a control system for a hydrokinetic device such as a dynamometer, a brake or a torque converter includes means for measuring a selected hydrokinetic device operating parameter to give a first electrical representative signal; means for providing a second electrical signal representative of a desired value of the said parameter; and means for deriving an electrical difference signal dependent upon the difference between the first and second signals, the difference signal being applied to an electrical control unit; in which the output from the control unit is adapted to control the position of a valve element disposed in a valve passage associated, in use, with the inlet or outlet sides of the device, a throat defined between the valve element and the passage being shaped to provide a variable throttle for fluid flowing through the passage so that, in use, displacement of the valve element is directly proportional to the torque developed by said device.

In a modification of this system the difference signal is applied to two control units, the outputs from which are adapted to control the position of a respective one of two valve elements each disposed in a corresponding valve passage associated, in use, with the inlet and outlet sides of the device respectively, a throat defined between each element and its corresponding passage being shaped to provide a variable throttle for fluid flowing through that passage so that, in use, displacement of the valve elements is directly proportional to the torque developed by said device.

Preferably, the or each valve element is in the form of an at least partially pressure balanced rotary member such as, for example, a ball, plate, disc or butterfly-type member. The desired linear relationship between dynamometer torque and the angular movement of the valve element may be achieved by using a square, rectangular, circular or eliptical valve element and suitably shaping the valve passage or by suitably shaping the or each valve element and using it with a profiled valve passage of square, rectangular, circular or eliptical cross-section. Either form of valve is cheap to manufacture and being partially pressure balanced does not require a large operating force.

The control unit may comprise any form of electric motor, the speed of which is controlled by a difference signal, the output shaft being mechanically linked to the or each valve element. Other alternatives include:

a. An electrical servo-valve operated by the difference signal and supplying pressurised hydraulic fluid to a hydraulic actuator mechanically linked to the butterfly valve.

b. An electrical servo-valve operated by the difference signal and supplying compressed air to a pneumatic actuator mechanically linked to the butterfly valve.

Conveniently, to increase control flexibility, the means for deriving the electrical difference signal is a variable gain amplifier.

The invention will now be described in greater detail by way of example, with reference to the accompanying drawings in which:

FIGS. 1 and 1A are diagrammatic end and sectional views showing a type of butterfly valve wherein the valve casing provides a characteristic relationship between dynamometer torque and valve opening, with FIG. 1A representing a section taken along the line X—X of FIG. 1;

Figure 2A:
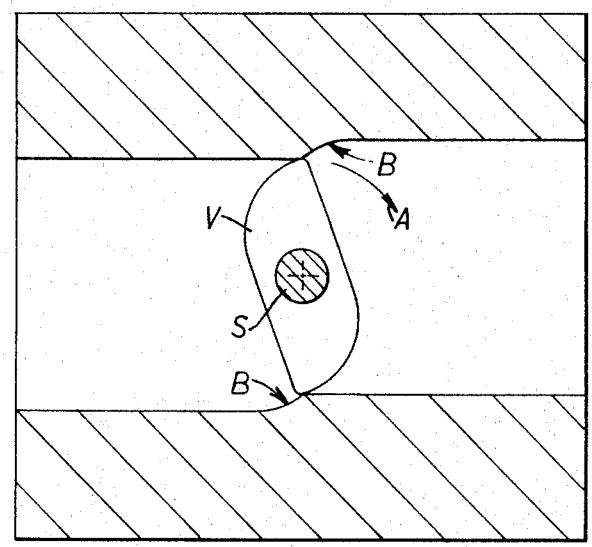
FIGS. 2 and 2A are diagrammatic and sectional views showing another form of valve having the same characteristic, with FIG. 2A representing a section taken along the line Y—Y of FIG. 2.

Referring to the drawings, FIG. 1 shows a butterfly valve adapted for connection to a dynamometer (not shown) and including a valve element V mounted for rotation on a shaft S and fitted in a body B so formed that in conjunction with the valve element V it provides a variable throttle for fluid flowing through the dynamometer whereby the angular movement of the valve element has a linear relationship to the dynamometer torque. This linearisation feature greatly simplifies the electric control unit. The arrow A shows the direction of rotation of the element. The fluid flow can be in either direction.

Figure 2:
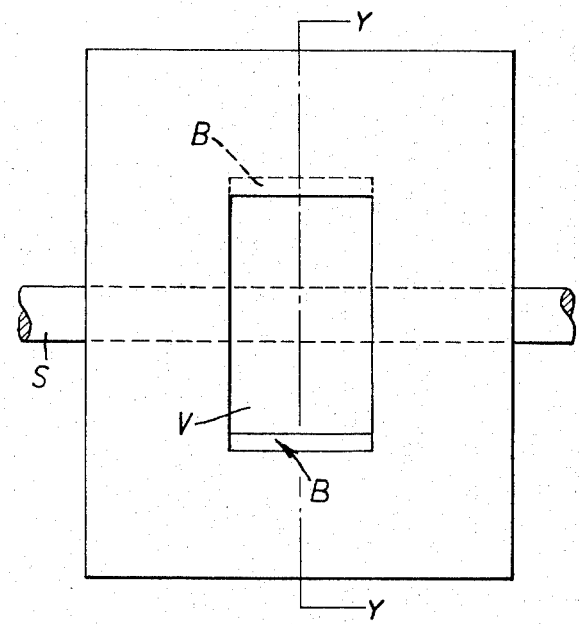

FIG. 2 shows another type of butterfly valve wherein element V is formed, together with the body B, to provide similar characterising of the dynamometer torque/valve angle relationship.

Figure 3:
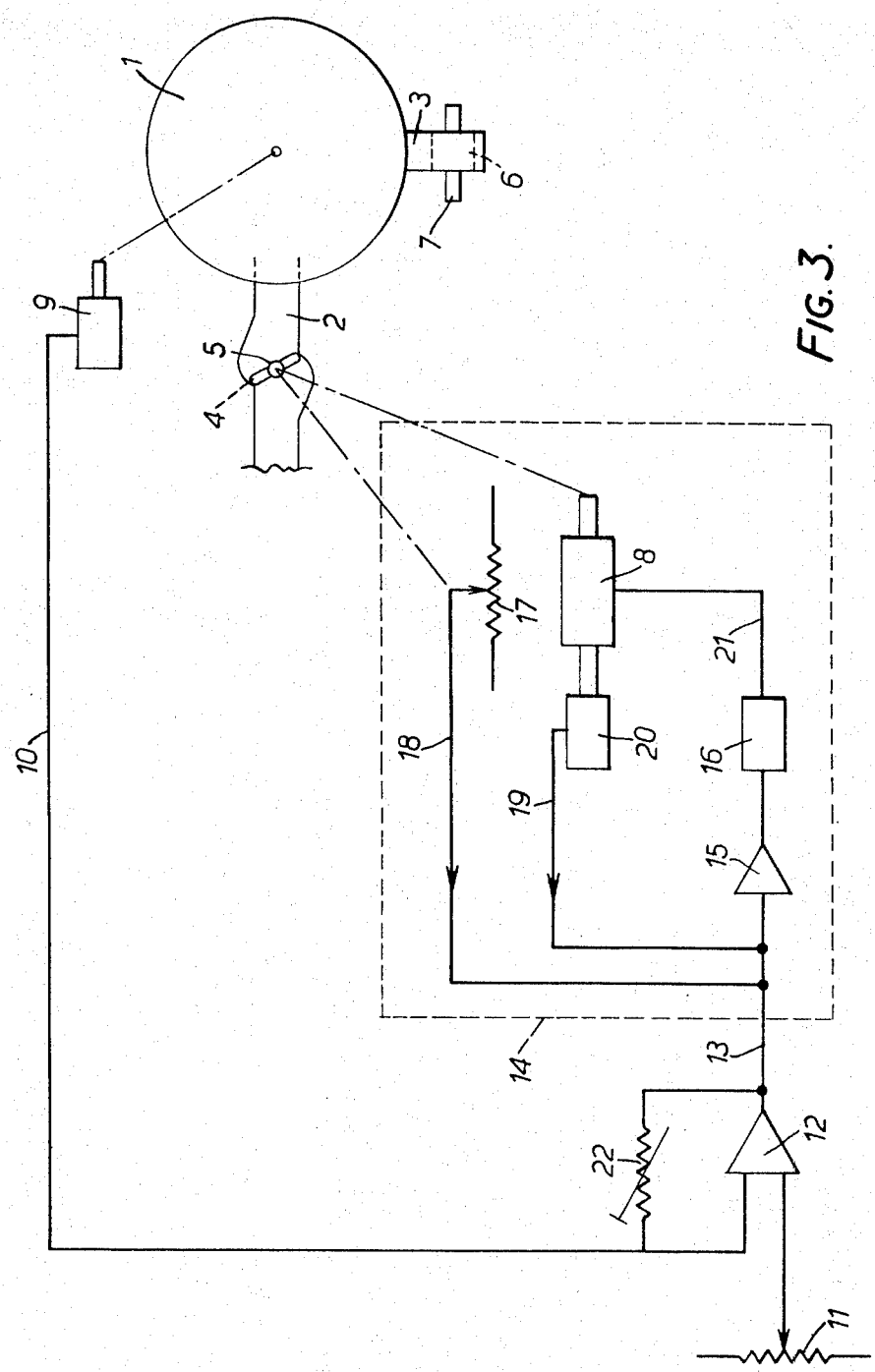
FIG. 3 shows diagrammatically a control system in accordance with the invention.

FIG. 3 shows diagrammatically a hydrokinetic dynamometer 1 having an inlet 2 and an outlet 3. The inlet 2 may be provided with a characterised butterfly valve of either of the types previously described and having a valve 4 mounted on a shaft 5, or any other pressure balanced valve having a rotating element such as a ball, plate or disc. The shaft 5 can be driven by the output from the actuator 8.

A measuring device 9 measures the value of an actual operating parameter of the dynamometer (torque, speed or acceleration) and provides a first electrical signal on line 10. Generally indicated at 11 is a device which provides a second electric signal representative of the desired value of the operating parameter, this together with the signal on line 10 being fed into a variable gain amplifier 12 which delivers a difference signal on line 13. The device 11 is shown as a tapping from a potentiometer which is suitable if the desired parameter value is to be constant. If, on the other hand, the value is to follow some programme, the device 11 will provide a signal which varies in the desired manner.

The signal on line 13 provides an input to a positional controller servo system contained within the broken line block 14 which includes the actuator 8 and a control amplifier 15. The actuator 8 drives, as well as the shaft 5, a potentiometer 17 to provide a positional feedback on line 18. An acceleration feedback on line 19 is derived from a unit 20 which may measure the acceleration of the shaft 5 in any suitable manner. The output from the control amplifier 15 is put through an output stage 16 to the line 21 feeding the actuator 8.

The actuator 8 can comprise an electric motor and reduction gearbox, a printed circuit motor or linear motor, mechanically linked to the shaft 5 or an electric servovalve supplying pressurised hydraulic fluid to a hydraulic actuator mechanically linked to the shaft 5 of an electric servo-valve supplying compressed air to a pneumatic actuator mechanically linked to the shaft 5.

The outlet 3 may also be provided with a characterised butterfly valve of either of the types previously described and having a valve element 6 mounted on a shaft 7 or any other pressure balanced valve having a rotating element such as a ball, plate or disc. The shaft 7 can be driven by another actuator fed from the difference signal on line 13 in the same manner as the actuator 8.

The dynamometer can be controlled using either the inlet or outlet controllers or a combination of both controllers.

Operation for speed control using the inlet controller only will now be described. In this case the device 9 will be a tacho-generator or a frequency pick-up with pulse convertor or any similar means of providing a positive voltage on line 10 which represents the actual angular velocity of the dynamometer. The potentiometers 11 and 17 have voltages applied to them in the same sense, zero voltage on potentiometer 17 representing the condition at which the butterfly valve element 4 is in the closed position.

A positive voltage appearing at the output line 13 of the amplifier 12 tends to open the valve so that the negative voltage then appearing on line 18 will tend to cancel this voltage. A negative voltage appearing at the output of amplifier 12 will have no effect since it tends to close the valve which is already in the closed position when the signal is zero. If the speed control is required to take effect at angular velocity represented by a voltage of say +5 volts on line 10, the arm on potentiometer 11 is set to −5 volts. At standstill the output of amplifier 12 will be negative and thus the butterfly element 4 will be in the closed position and there will be no signal on line 18. Furthermore, as long as the dynamometer is running at an angular velocity less than that represented by +5 volts on line 10, the output from amplifier 12 will remain negative and the valve element 4 will remain in the closed position.

When the dynamometer angular velocity reaches and passes through the selected velocity, the output of amplifier 12 becomes positive whereby the butterfly valve element is driven towards the open position to increase the dynamometer load until the difference signal from amplifier 12 is balanced by the voltage on line 18 provided by the positional control 17. Clearly, when the angular velocity drops slightly but still remains above the selected value, the input to amplifier 15 will be negative whereby the valve 5 is closed slightly until a voltage balance is again obtained.

Figure 4:
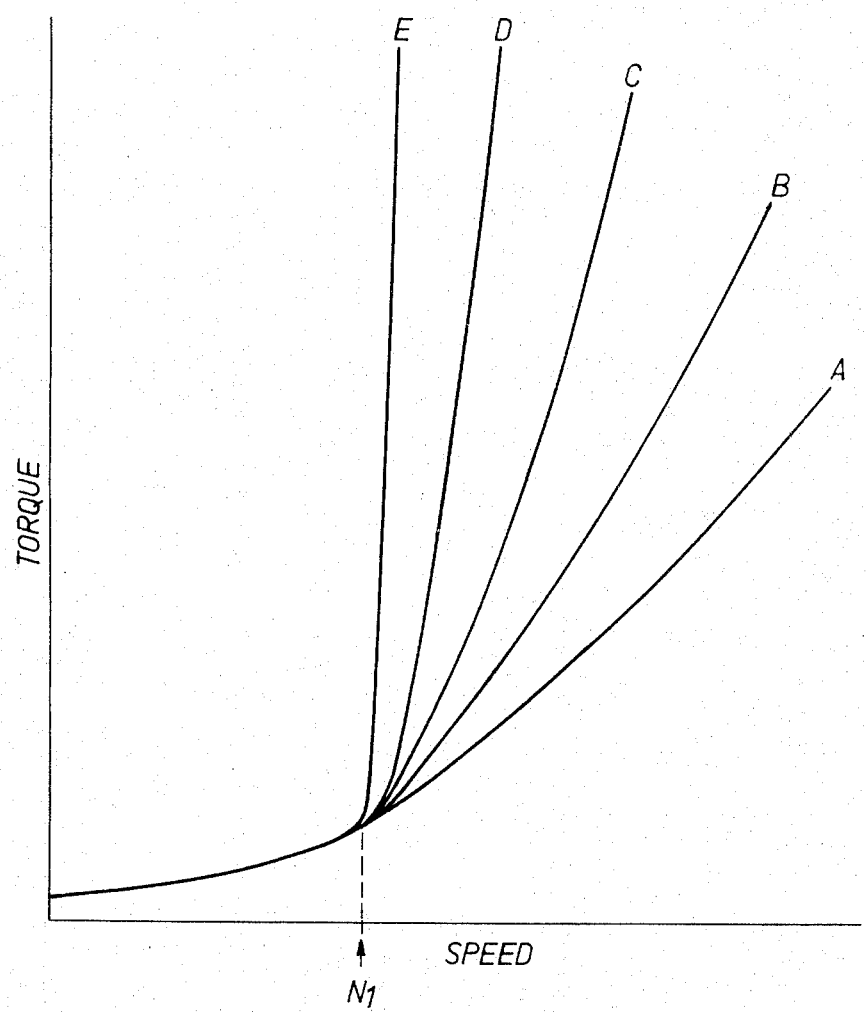
FIG. 4 shows dynamometer characteristics when employing a control system such as shown in FIG. 3.

It will also be appreciated that the control characteristic will depend upon the relationship between the magnitude of the voltage appearing at the outlet of amplifier 12 and the change in voltage on line 18 for any given adjustment of the valve 5. Considering FIG. 4 which shows a plot of torque against speed for a control at an angular velocity N, it will be seen that there are any number of curves, of which A, B, C, D and E are typical examples which can be obtained. If amplifier 12 has a relatively low gain, a given increase in angular velocity will give rise only to small positive voltage to be backed off by the voltage on line 18 whereby a control such as Curve A is obtained. If, on the other hand, the amplifier 12 has a high gain, a small increase in velocity will provide a larger signal to be backed off, and ultimately a characteristic such as Curve E may be obtained. In order that flexibility of control may be achieved, amplifier 12 may be made as a variable gain amplifier as indicated in FIG. 3 by the shunt resistor 22.

TORQUE CONTROL

If the speed derived from device 9 is replaced by an electrical signal proportional to torque, derived from a transducer in the dynamometer load indicating system, the dynamometer will exhibit a torque control characteristic, the controlling sequence being similar to that described for speed control.

PROGRAMME AND SEQUENCE CONTROL

In a comprehensive engine test plant it is desirable control speed and torque and to be able to vary the 'desired values' in any predetermined manner. It is clear that the system embodying the present invention can be readily adapted to provide any desired relationship of torque, speed and acceleration with respect to time. Further, the satisfactory operation of a system embodying the invention when used for sequence or programme control, does not depend upon the prime mover throttle control being operated in a particular manner. We claim:

1. In the combination of a control system and a hydrokinetic device in which the torque developed by said hydrokinetic device varies in dependence on the setting of at least one at least partially pressure balanced valve element controlling the effective cross-sectional area of a passage communicating therewith, said control system including means for measuring a selected operating parameter of said hydrokinetic device to give a first electrical representative signal; means for providing a second electrical signal representative of a desired value of the said parameter; and means for deriving an electrical difference signal dependent upon the difference between the first and second signals, the difference signal being applied to an electrical control unit in which the output from the control unit is adapted to control the position of said at least one valve element, the improvement which comprises a throat defined between said at least one valve element and the passage controlled thereby, which throat is shaped to provide a variable throttle for fluid flowing through said passage such that the torque developed by said device varies substantially linearly with the displacement of said at least one valve element.

2. A combination as claimed in claim 1, in which the control unit comprises an electric motor the output shaft of which is mechanically linked to said at least one valve element.

3. A combination as claimed in claim 1, in which the control unit comprises an electrohydraulic servo-valve for supplying pressurised hydraulic fluid to a hydraulic actuator mechanically linked to said at least one element.

4. A combination as claimed in claim 1, in which the control unit comprises an electropneumatic servo-valve for supplying compressed air to a pneumatic actuator mechanically linked to said at least one valve element.

5. A combination as claimed in claim 1, in which the means for deriving the electrical difference signal is a variable gain amplifier.

* * * * *